(12) United States Patent
Kouyanagi et al.

(10) Patent No.: US 9,973,140 B2
(45) Date of Patent: May 15, 2018

(54) SOLAR CELL MODULE

(71) Applicant: Panasonic Intellectual Property Management Co., Ltd., Osaka-shi, Osaka (JP)

(72) Inventors: Masao Kouyanagi, Osaka (JP); Shingo Okamoto, Osaka (JP); Shinichiro Tsujii, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 14/717,347

(22) Filed: May 20, 2015

(65) Prior Publication Data

US 2015/0256125 A1    Sep. 10, 2015

Related U.S. Application Data

(63) Continuation of application No. PCT/JP2013/006813, filed on Nov. 20, 2013.

(30) Foreign Application Priority Data

Nov. 21, 2012    (JP) .................................. 2012-255032

(51) Int. Cl.
*H02S 30/00* (2014.01)
*H02S 30/10* (2014.01)
(Continued)

(52) U.S. Cl.
CPC ............ *H02S 30/10* (2014.12); *F24J 2/4614* (2013.01); *F24J 2/5211* (2013.01); *H02S 20/23* (2014.12);
(Continued)

(58) Field of Classification Search
CPC ........... H02S 30/00; H02S 30/10; Y02E 10/50
(Continued)

(56) References Cited

U.S. PATENT DOCUMENTS

2006/0219291 A1* 10/2006 Hikosaka ................ H02S 30/10
                                                          136/251
2009/0229654 A1*  9/2009 Morita .................... F24J 2/4614
                                                          136/251
(Continued)

FOREIGN PATENT DOCUMENTS

JP           0617257 U      3/1994
JP        2001291889 A     10/2001
(Continued)

OTHER PUBLICATIONS

International Search Report corresponding to Application No. PCT/JP2013/006813; dated Dec. 17, 2013, with English translation.

*Primary Examiner* — Lindsey Bernier
(74) *Attorney, Agent, or Firm* — Cantor Colburn LLP (57) ABSTRACT

A solar cell module comprises a solar cell panel and a frame. A holding portion of a frame piece constituting the frame includes: a base extending upper than the panel upper surface of the solar cell panel from a main body portion 30B and covering a panel side surface; a nail portion extending from the base to the side of the solar cell panel and covering the panel upper surface; a drainage hole formed by notching a part of the base, said part being positioned lower than the panel upper surface; and a water guide portion formed by notching the nail portion from a connection portion.

8 Claims, 6 Drawing Sheets

(51) Int. Cl.
  *H02S 20/23* (2014.01)
  *F24J 2/46* (2006.01)
  *F24J 2/52* (2006.01)
  *H02S 40/34* (2014.01)

(52) U.S. Cl.
  CPC .............. *H02S 40/34* (2014.12); *H02S 30/00* (2013.01); *Y02B 10/12* (2013.01); *Y02E 10/47* (2013.01); *Y02E 10/50* (2013.01)

(58) Field of Classification Search
  USPC ................................................. 136/244, 251
  See application file for complete search history.

(56) References Cited

U.S. PATENT DOCUMENTS

| | | |
|---|---|---|
| 2011/0011446 A1 | 1/2011 | Hirayama |
| 2011/0253201 A1 | 10/2011 | Morita et al. |
| 2012/0233840 A1 | 9/2012 | Motoyama |
| 2014/0283911 A1* | 9/2014 | Tsujimoto ........... H01L 31/0424 |
| | | 136/259 |

FOREIGN PATENT DOCUMENTS

| | | | |
|---|---|---|---|
| JP | 2001339087 A | 12/2001 | |
| JP | 2011114255 A | 6/2011 | |
| WO | 2006098473 A1 | 9/2006 | |
| WO | 2009119775 A1 | 10/2009 | |
| WO | WO 2013115215 A1 * | 8/2013 | ......... H01L 31/0424 |

\* cited by examiner

SOLAR CELL MODULE

CROSS-REFERENCE TO RELATED APPLICATION

The present application is a continuation under 35 U.S.C. § 120 of PCT/JP2013/006813, filed Nov. 20, 2013, which is incorporated herein by reference and which claimed priority under 35 U.S.C. § 119 to Japanese Patent Application No. 2012-255032 filed Nov. 21, 2012, the entire content of which is also incorporated herein by reference.

TECHNICAL FIELD

The present invention relates to a solar cell module.

BACKGROUND ART

Patent Literature 1 discloses a solar cell module in which a notch for drainage is provided in a part of a frame attached to a solar cell panel.

CITATION LIST

Patent Literature

Patent Literature 1: Japanese Utility Model Laid-Open Publication No. Hei6-17257

SUMMARY OF INVENTION

Technical Problem

Meanwhile, the frame of the solar cell module has a function of protecting the edges of the solar cell panel. Accordingly, a frame structure is required such that water such as rain water can be efficiently drained from the module without impairing such a function.

Solution To Problem

There is provided a solar cell module according to the present invention, including: a solar cell panel; a frame constituted by connecting a plurality of frame pieces each of which includes a main body portion; a holding portion provided on the main body portion to form a groove into which an edge of the solar cell panel is fitted, the holding portion including a base which extends upper than a panel upper surface of the solar cell panel from the main body portion and covers a panel side surface of the solar cell panel; a nail portion which extends from the base toward the solar cell panel and covers the panel upper surface; a drainage hole formed by cutting away a portion, of the base, positioned lower than the panel upper surface from a connection portion of the frame pieces; and a water guide portion formed by cutting away the nail portion from the connection portion.

Advantageous Effects of Invention

In accordance with the solar cell module according to the present invention, water such as rain water may be efficiently drained outside the module while the edges of the solar cell panel are protected.

DESCRIPTION OF EMBODIMENTS

Embodiments according to the present invention are described in detail with reference to the drawings. The present invention is not limited to the embodiments below. Moreover, the drawings referred to in the embodiments are schematically represented, and the dimensions, ratios and the like of the constituents drawn in the drawings are sometimes different from those of the real articles. Their specific dimensions, ratios and the like are to be determined in consideration of the description below.

When "substantially identical" exemplifies explanation of "substantially **" in the specification, this is intended to include being recognized to be substantially identical as well as being completely identical. Moreover, in the specification, a "vertical direction" means the thickness direction of a solar cell panel 11.

Figure 1:
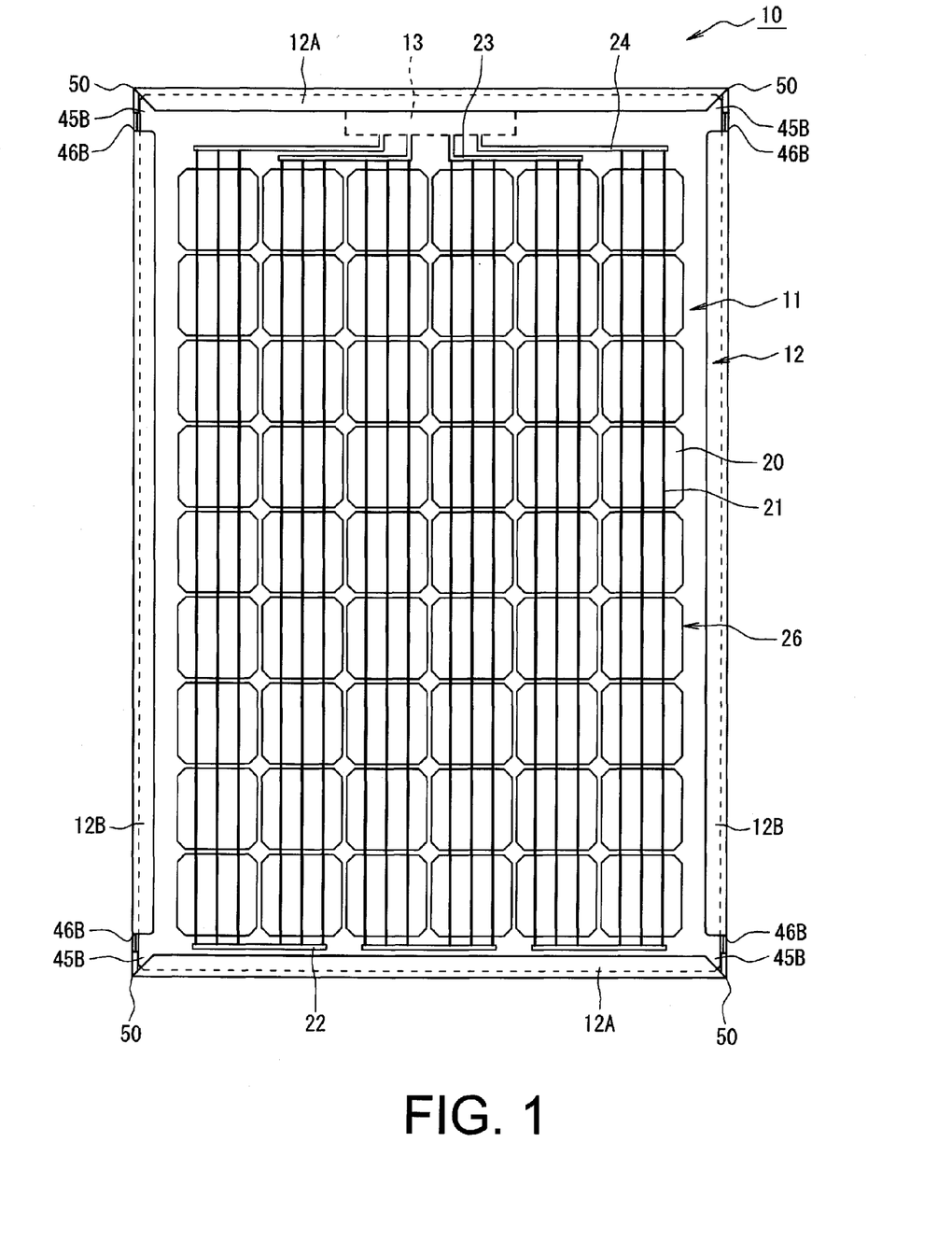
FIG. 1 is a plan view of a solar cell module which is one example of an embodiment according to the present invention as seen from a panel upper surface side.

FIG. 1 is a plan view of a solar cell module 10 which is one example of an embodiment according to the present invention as seen from a panel upper surface 11a side of the solar cell panel 11. Herein, the "panel upper surface 11a" means a light receiving surface that sunlight is mainly incident on among principal surfaces perpendicular to the thickness direction of the solar cell panel 11 (hereinafter sometimes referred to as "light receiving surface"). The back surface opposite to the panel upper surface 11a among the principal surfaces is a "panel lower surface 11b" (hereinafter sometimes referred to as "back surface"). In other words, a surface side which has a larger formation area of electrodes, mentioned later, or a surface side in the case where the electrodes are formed only on this one surface becomes the panel lower surface 11b. A "panel side surface 11c" is a surface, of the solar cell panel 11, along the thickness direction thereof, that is, a surface perpendicular to the principal surfaces.

The solar cell module 10 includes the solar cell panel 11 and a frame 12 attached to the edges of the solar cell panel 11. It is preferable that the frame 12 is constituted by connecting a plurality of frame pieces 12A and 12B to each other. The solar cell panel 11 exemplarily illustrated in FIG. 1 has a rectangular shape in a plan view, with a pair of frame pieces 12A and a pair of frame pieces 12B being attached to the edges on the short sides thereof and to the edges on the long sides thereof, respectively. Notably, "in a plan view" means a planar shape as seen in the normal direction to the panel upper surface 11a.

The solar cell panel 11 includes a plurality of solar cell elements 20, a first protection member disposed on the light receiving surface side of the solar cell elements 20, and a second protection member disposed on the back surface side of the solar cell elements 20. The plurality of solar cell elements 20 are disposed between the first protection member and the second protection member, and are sealed with a filling material. Moreover, in the embodiment, a terminal box 13 is attached to the panel lower surface 11c side of the solar cell panel 11. The terminal box 13 has, for example, a substantially rectangular solid shape and is attached to be in contact with the inner side of the frame piece 12A such that its longitudinal direction is substantially parallel to the short side of the solar cell panel 11.

The solar cell panel 11 includes wiring materials 21 attached to electrodes of the solar cell elements 20. The wiring material 21 connects the adjacent solar cell elements 20 in series to form a string 26. The plurality of strings 26 are arranged in the direction perpendicular, in the same plane, to the direction in which the plurality of solar cell elements 20 are connected in series (that is, the longitudinal direction of the string 26).

Moreover, it is preferable that the solar cell panel 11 includes first crossover wiring materials 22, second crossover wiring materials 23 and output wiring materials 24 which are disposed in the vicinities of the end portions of the strings 26 in the longitudinal direction. In the example illustrated in FIG. 1, the second crossover wiring materials 23 and the output wiring materials 24 are disposed on the terminal box 13 side, and the first crossover wiring materials 22 are disposed on the opposite side to the second crossover wiring materials 23 and the like to interpose the strings 26. The first crossover wiring material 22 connects the wiring materials 21 of the adjacent strings 26 together. The second crossover wiring material 23 connects the wiring materials 21 of the adjacent strings 26 together and is connected to the terminal box 13. The output wiring materials 24 are connected to the wiring materials 21 of the strings 26 positioned at both ends of the columns, and are connected to the terminal box 13 as a negative electrode terminal and a positive electrode terminal.

The solar cell element 20 includes a photoelectric conversion portion generating carriers by receiving sunlight. In the photoelectric conversion portion, for example, a light receiving surface electrode and a back surface electrode (each not shown) are formed on the light receiving surface and the back surface, respectively. Notably, the structure of the solar cell element 20 is not specifically limited, and, for example, there may be a structure in which the electrodes are formed only on the back surface of the photoelectric conversion portion.

The photoelectric conversion portion has, for example, a semiconductor substrate such as crystalline silicon (c-Si), gallium arsenide (GaAs) and indium phosphorus (InP), an amorphous semiconductor layer formed on the substrate, and a transparent conductive layer formed on the amorphous semiconductor layer. Specific examples include a structure in which on the light receiving surface of an n-type single crystal silicon substrate, an i-type amorphous silicon layer, a p-type amorphous silicon layer and a transparent conductive layer are formed in this order, and on the back surface thereof, an i-type amorphous silicon layer, an n-type amorphous silicon layer and a transparent conductive layer are formed in this order. It is preferable that the transparent conductive layer is constituted of transparent conductive oxide obtained by doping metal oxide such as indium oxide ($In_2O_3$) or zinc oxide (ZnO) with tin (Sn), antimony (Sb) and/or the like.

The electrode is composed, for example, of a plurality of finger portions and a plurality of bus bar portions. The finger portion is an electrode with thin line shapes formed over a wide range on the transparent conductive layer, and the bus bar portion is an electrode collecting carriers from the finger portion. The wiring material 21 is attached to the bus bar portion.

For the first protection member, for example, a member having translucency such as a glass substrate, a resin substrate and a resin film can be used. Among these, in view of fire resistance, durability and the like, the glass substrate is preferable. For the second protection member, the same member as for the first protection member can be used, and when it is not assumed that light is incident from the back surface side, a member not having translucency can also be used. For the filling material, for example, resin such as a copolymer of ethylene and vinyl acetate (EVA) and poly (vinyl butyral) (PVB) can be used.

The frame 12 is constituted, as above, by combining the plurality of frame pieces 12A and 12B with different shapes, and surrounds the four sides of the solar cell panel 11. The frame 12 is a frame made of metal such as stainless steel and aluminum, and in view of being light in weight, is preferably made of aluminum. The frame 12 protects the edges of the solar cell panel 11, and in addition, for example, is used for a fixing member when the solar cell module 10 is installed on a roof or the like. Moreover, when the frame 12 is disposed in contact with the terminal box 13, it is also used for heat dissipation of elements (for example, by-pass diodes) implemented in the terminal box 13.

It is preferable that the frame pieces 12A and 12B have inclined end surfaces 51A and 51B formed by cutting both end portions thereof in their longitudinal directions obliquely relative to the longitudinal directions, respectively. The inclined end surfaces 51A and 51B are formed so as to coincide with one another in connection portions 50 at which the frame pieces 12A and 12B are connected to one another. The connection portions 50 are provided at four places corresponding to the four corners of the solar cell panel 11. Namely, the connection portions 50 form the four corners of the solar cell module 10 and the frame 12.

It is preferable that each of the frame pieces 12A and 12B has a trapezoidal shape, in a plan view, which becomes smaller toward the inside which is the side of the center part of the solar cell panel 11. In particular, it is preferable that all of the inclination angles of the inclined end surfaces 51A and 51B relative to the longitudinal directions of the frame pieces 12A and 12B are substantially 45°.

Figure 2:
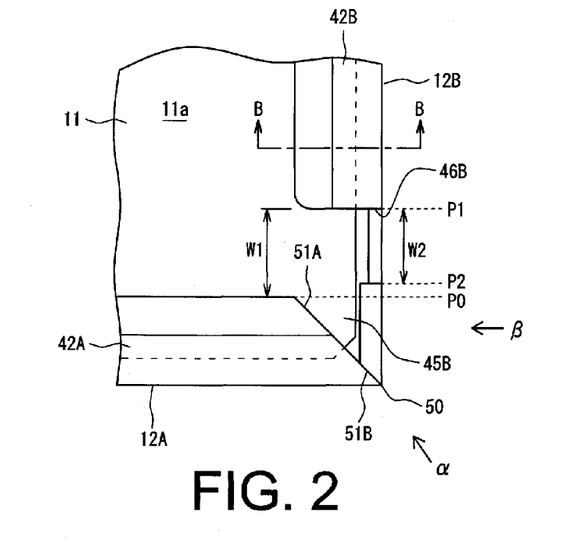
FIG. 2 is an expanded view of an A portion in FIG. 1.
Figure 3:
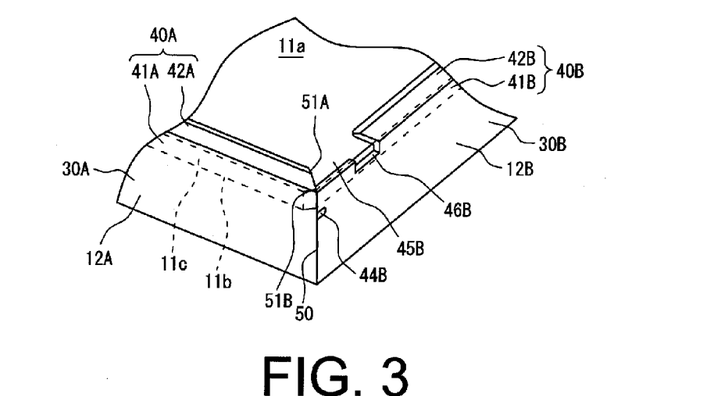
FIG. 3 is a perspective view as seen from a direction of an arrow α in FIG. 2.
Figure 4:
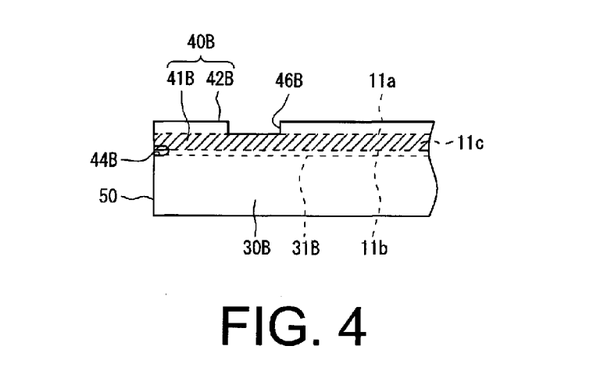
FIG. 4 is a lateral view as seen from a direction of an arrow β in FIG. 2.
Figure 5:
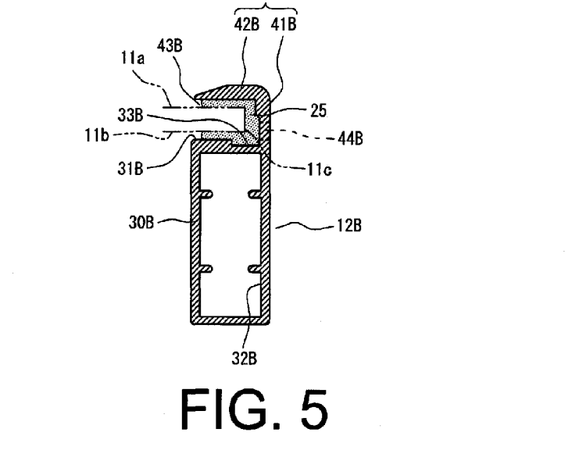
FIG. 5 is a cross section taken along a BB line in FIG. 2.

Hereafter, further referring to FIG. 2 to FIG. 5, the configuration of the frame 12 is described in detail. FIG. 2 is an expanded view of an A portion in FIG. 1 (the vicinity of the corner of the solar cell module 10). FIG. 3 is a perspective view as seen from the direction of an arrow α in FIG. 2, FIG. 4 is a lateral view as seen from the direction of an arrow β in FIG. 2, and FIG. 5 is a cross section taken along the BB line in FIG. 2 (taken along the plane perpendicular to the longitudinal direction of the frame piece 12B). FIG. 5 illustrates a drainage hole 44B not present in the relevant cross section with a broken line. Hereafter, otherwise specifically noted, the "cross section" of the object means the cross section taken along the plane perpendicular to the longitudinal direction thereof.

The frame pieces 12A and 12B have main body portions 30A and 30B, and holding portions 40A and 40B, respectively. Differences in structure between the frame pieces 12A and 12B include the lengths in the longitudinal directions, and the presence or absence of the drainage hole 44B, a water guide portion 45B and a drainage outlet portion 46B which are mentioned later. For the others, they can be configured to have the same structure. Hereafter, the structure of the frame piece 12B is exemplarily described.

The main body portion 30B has, for example, a substantially rectangular cross-sectional shape extending moderately longer in the vertical direction (refer to FIG. 5). The holding portion 40B is provided on the main body portion 30B and has, for example, a substantially L-shaped cross section. Furthermore, the holding portion 40B forms a groove 43B which the solar cell panel 11 is fitted into. In more detail, an upper surface 31B of the main body portion 30B and the holding portion 40B form the groove 43B, the edge of the solar cell panel 11 is placed on the upper surface 31B, and thus, the edge of the solar cell panel 11 is disposed so as to be covered by the holding portion 40B. Since, in the groove 43B, gaps are present between the solar cell panel 11 and the main body portion 30B and between the solar cell panel 11 and the holding portion 40B, it is preferable that the gaps are filled with an adhesive 25 to fix the solar cell panel 11. Notably, in this case, the adhesive 25 is not provided in the vicinity of the corner portion of the solar cell panel 11 so as not to prevent drainage.

It is preferable that the main body portion 30B has a hollow portion 32B inside extending in the longitudinal direction. Into the hollow portion 32B, for example, a corner piece can be press-fitted from the end portion in the longitudinal direction, and the corner piece connects the frame pieces 12A and 12B together. Moreover, it is preferable that the main body portion 30B has a recess portion 33B having a part of the upper surface 31B recessed in order that the adhesive 25 is prevented from protruding off the groove 43B without impairing its filling ability.

The holding portion 40B includes a base 41B extending upward from the upper surface 31B of the main body portion 30B, and a nail portion 42B extending from the base 41B toward the opening side of the groove 43B. The base 41B extends further up than the panel upper surface 11a of the solar cell panel 11 which is fitted into the groove 43B, to cover the panel side surface 11c. The nail portion 42B covers the panel upper surface 11a. Herein, "the base 41B covers the panel side surface 11b" means that the base 41B is disposed at a position opposite to the panel side surface 11c and closely thereto. Similarly, "the nail portion 42B covers the panel upper surface 11a" means that the nail portion 42B is disposed at a position opposite to the panel upper surface 11a and closely thereto.

It is preferable that the base 41B extends from the main body portion 30B along the vertical direction, and that the outer surface of the base 41B and the outer surface of the main body portion 30B constitute the same plane. Notably, "outer surface" means the surface that is separated most from the center part of the solar cell module 10 out of surfaces extending in the vertical direction to the solar cell panel 11. Moreover, it is preferable that the nail portion 42B extends from the upper end of the base 41B in substantially parallel to the upper surface 31B. Namely, the base 41B and the nail portion 42B are substantially perpendicular to each other. The distance between the upper surface 31B and the nail portion 42B along the vertical direction, that is, the length of the groove 43B in the vertical direction is designed so as to be slightly larger than the thickness of the solar cell panel 11 in consideration of fitting ability and the like of the panel.

It is preferable that the length of the nail portion 42B in the width direction is substantially the same as the length of the main body portion 30B in the width direction. In other words, the nail portion 42B only covers the portion, of the panel upper surface 11a, that is disposed above the main body portion 30B. Herein, the "width direction" means the direction perpendicular to the vertical direction in the cross section perpendicular of the longitudinal direction of the frame piece 12B. Moreover, it is preferable that the nail portion 42B has its upper surface inclined such that its thickness becomes thinner closer to its tip side. By doing so, it is possible to suppress the occurrence of a shadow caused by the thickness of the nail portion 42B.

Furthermore, the holding portion 40B has the drainage hole 44B formed in the base 41B, the water guide portion 45B formed in the nail portion 42B, and the drainage outlet portion 46B communicating with the water guide portion 45B (refer to FIG. 3). In the embodiment, out of the frame pieces 12A and 12B forming the connection portion 50, only the frame piece 12B is provided with the drainage hole 44B, the water guide portion 45B and the drainage outlet portion 46B. Sets of the drainage hole 44B, the water guide portion 45B and the drainage outlet portion 46B are provided at four places in the entirety of the solar cell module 10 corresponding to the four corners of the solar cell panel 11, every two sets thereof being for each frame piece 12B. Notably, the drainage outlet portion 46B and the water guide portion 45B need to be formed in the same frame piece only when the drainage outlet portion 46B is formed. Nevertheless, the drainage hole 44B is not necessarily formed in the frame piece that the water guide portion 45B and the drainage outlet portion 46B are formed in, but it may be formed in the other frame piece connected thereto.

The drainage hole 44B is formed by cutting away the base 41B from the connection portion 50 with the frame piece 12A. Since the base 41B is joined to the base 41A in the connection portion 50, the drainage hole 44B is a through hole whose circumference is surrounded by the bases 41A and 41B. In more detail, the drainage hole 44B is formed in a portion, of the base 41B, positioned lower than the panel upper surface 11a. In other words, the portion, of the base 41B, positioned higher up than the panel upper surface 11a is not notched but brought into contact with the frame piece 12A to form the connection portion 50. According to such a configuration, the corners of the solar cell panel 11, which corners are portions which can easily suffer breakage, can be protected.

It is preferable that the drainage hole 44B is formed in a range of a lower half of the base 41B, and, for example, it is formed such that an extent of exposure of the solar cell panel 11 from the drainage hole 44B is small in a range that does not affect drainage ability. By doing so, the corners of the solar cell panel 11 can be further protected. Moreover, it is preferable that the lower end of the drainage hole 44B is positioned at substantially the same height as that of the upper surface 31B of the main body portion 30B (refer to FIGS. 4 and 5). Formation of such a drainage hole 44B communicating with the groove 43B makes it difficult for water to stay in the groove 43B, which improves drainage ability. In the embodiment, while the lower end of the drainage hole 44B is positioned at substantially the same height as the height of a portion, of the upper surface 31B, that the recess portion 33B is not formed in, the drainage hole 44B may be formed to match the height of the recess portion 33B.

The shape of the drainage hole 44B can be a substantially rectangular shape which is long in the longitudinal direction of the frame piece 12B. It should be noted that the shape and dimensions of the drainage hole 44B are not specifically limited but can be properly set in consideration of required drainage ability and the like.

The water guide portion 45B is formed by cutting away the nail portion 42B from the connection portion 50. It is preferable that the tip side of the nail portion 42B is cut away to form the water guide portion 45B in which water flows along the inclination end surface 51A of the nail portion 42A of the frame piece 12A. In the embodiment, the nail portion 42B is cut away substantially entirely from the connection portion 50 to P1 along the longitudinal direction of the frame piece 12B. P1 can be set to a position separate from a position P0 at the inner end along the longitudinal direction of the frame piece 12A by approximately the same extent of the length of the frame piece in the width direction.

The water guide portion 45B has a function of guiding water such as rain water flowing down on the panel upper surface 11a to the drainage hole 44B. Moreover, it has a function of guiding rain water and the like to the drainage outlet portion 46B, communicating with the drainage outlet portion 46B. There is a case where a gap is still present between the solar cell panel 11 and the frame piece 12B after being filled with the adhesive 25. Otherwise, a gap can be allowed to remain by adjusting the amount of filling of the adhesive 25. Therefore, while water can be drained from the drainage hole 44B or the like even when the water guide portion 45B is not formed, formation of the water guide portion 45B can improve drainage ability.

It is preferable that the water guide portion 45B has a smaller area as going toward the drainage hole 44B side. In other words, it is preferable that the water guide portion 45B has a tapered shape which becomes thinner going from the inside toward the drainage hole 44B side. In the embodiment, the water guide portion 45B is formed which has an inclination angle of substantially 45° relative to the longitudinal direction of the frame piece 12A and is along the inclination end surface 51A. By doing so, rain water or the like is allowed to easily flow to the drainage hole 44B side along the inclination end surface 51A, which improves drainage ability.

The drainage outlet portion 46B is formed by cutting away a portion, of the base 41B, that is positioned higher than the panel upper surface 11a at a position separate from the connection portion 50. The drainage outlet portion 46B communicates with the water guide portion 45B as above, and water flowing in the water guide portion 45B can be drained from the drainage outlet portion 46B. It is preferable that the drainage outlet portion 46B is recessed to substantially the same height as that of the panel upper surface 11a. By doing so, drainage ability from the drainage outlet portion 46B is improved.

It is preferable that the drainage outlet portion 46B is formed from P2, which is separate from the connection portion 50, to P1, which is an end of the water guide portion 45B (refer to FIG. 2). While P2 can be configured to be more on the connection portion 50 side than P0, preferably, it is configured to be a position more separate from the connection portion 50 than P0. Furthermore, it is particularly preferable that the length of the drainage outlet portion 46B along the longitudinal direction of the frame piece 12B (hereinafter referred to as "notch width W2" of the drainage outlet portion 46B) is smaller than the length of the water guide portion 45B along the inner end (hereinafter referred to as "notch width W1" of the inlet of the water guide portion 45). By configuring notch width W2<notch width W1, for example, it is possible to prevent dust from staying in the water guide portion 45B or the like as a result of an increase in the flow rate of rain water or the like in the water guide portion 45B.

According to the solar cell module 10 including the above-mentioned configuration, water such as rain water can be efficiently drained outside the module while the edges of the solar cell panel 11, particularly, the corners of the panel which corners can easily suffer breakage, are protected.

Figure 6:
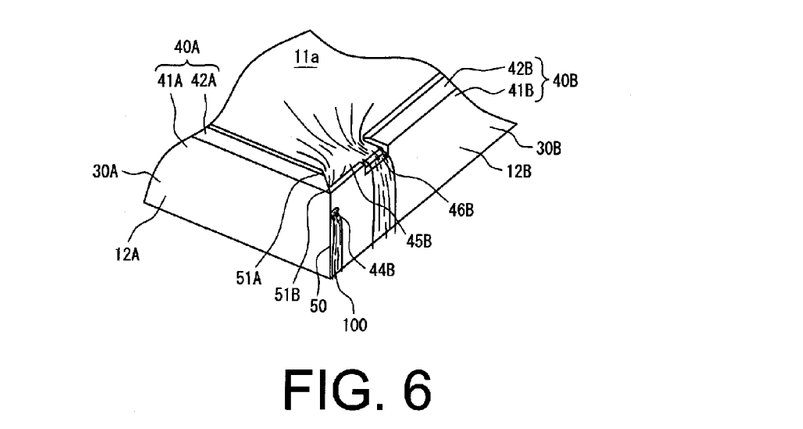
FIG. 6 is a diagram illustrating a situation in which rain water flows in FIG. 3.

FIG. 6 illustrates a situation in which water flowing on the panel upper surface 11a is drained from the drainage hole 44B and the drainage outlet portion 46B. In FIG. 6, the solar cell module 10 is installed such that the frame piece 12A on the terminal box 13 side is positioned upward and the frame piece 12A disposed opposite thereto downward. Some of water 100 flowing on the panel upper surface 11a is drained over the frame piece 12A, and some thereof flows along the frame piece 12A, flows into the water guide portion 45B and is drained from the drainage hole 44B and the drainage outlet portion 46B. When the amount of the water 100 is large, it is drained from both the drainage hole 44B and the drainage outlet portion 46B, and in particular, the amount of drainage is larger from the drainage outlet portion 46B. On the other hand, when the amount of the water 100 is small, there can be a case where it is drained only from the drainage hole 44B. As above, according to the solar cell module 10, the water 100 flowing on the panel upper surface 11a can be easily drained outside the module.

Moreover, in the solar cell module 10, the corners of the solar cell panel 11, which can easily suffer breakage, can be protected without impairing drainage ability since the drainage hole 44B is formed in a portion, of the base 41B, positioned lower than the panel upper surface 11a.

Hereafter, modifications of the embodiment according to the present invention are described using FIG. 7 to FIG. 12. Herein, the same constituents as those in the above-mentioned embodiment are given the same signs, their duplicated description is omitted, and differences from the above-mentioned embodiment are described in detail.

Figure 7:
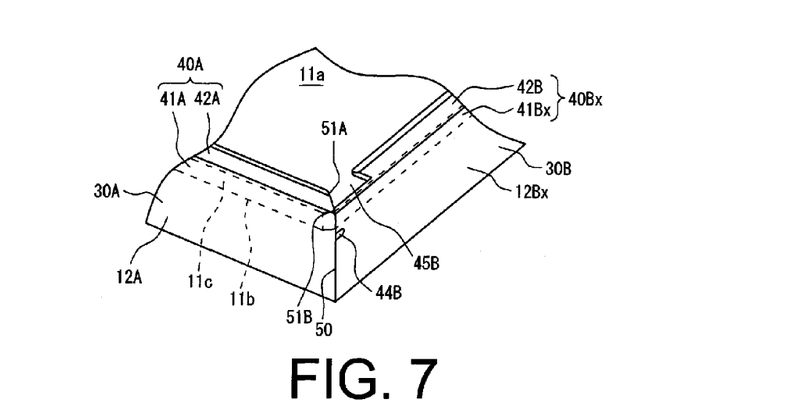
FIG. 7 is a diagram illustrating a solar cell module which is a first modification of the embodiment according to the present invention.

A mode exemplarily illustrated in FIG. 7 is different from the above-mentioned embodiment in that the drainage outlet portion 46B is not formed in a holding portion 40Bx of a frame piece 12Bx. In this case, the edge of the solar cell panel 11 can be more easily protected. Notably, while the water guide portion 45B illustrated in FIG. 7 has the same dimension as in the case of the above-mentioned embodiment, it may have a smaller dimension to widen a coverage area of the nail portion 42B over the panel upper surface 11a. On the other hand, the drainage hole 44B may be made larger to enhance drainage ability.

Figure 8:
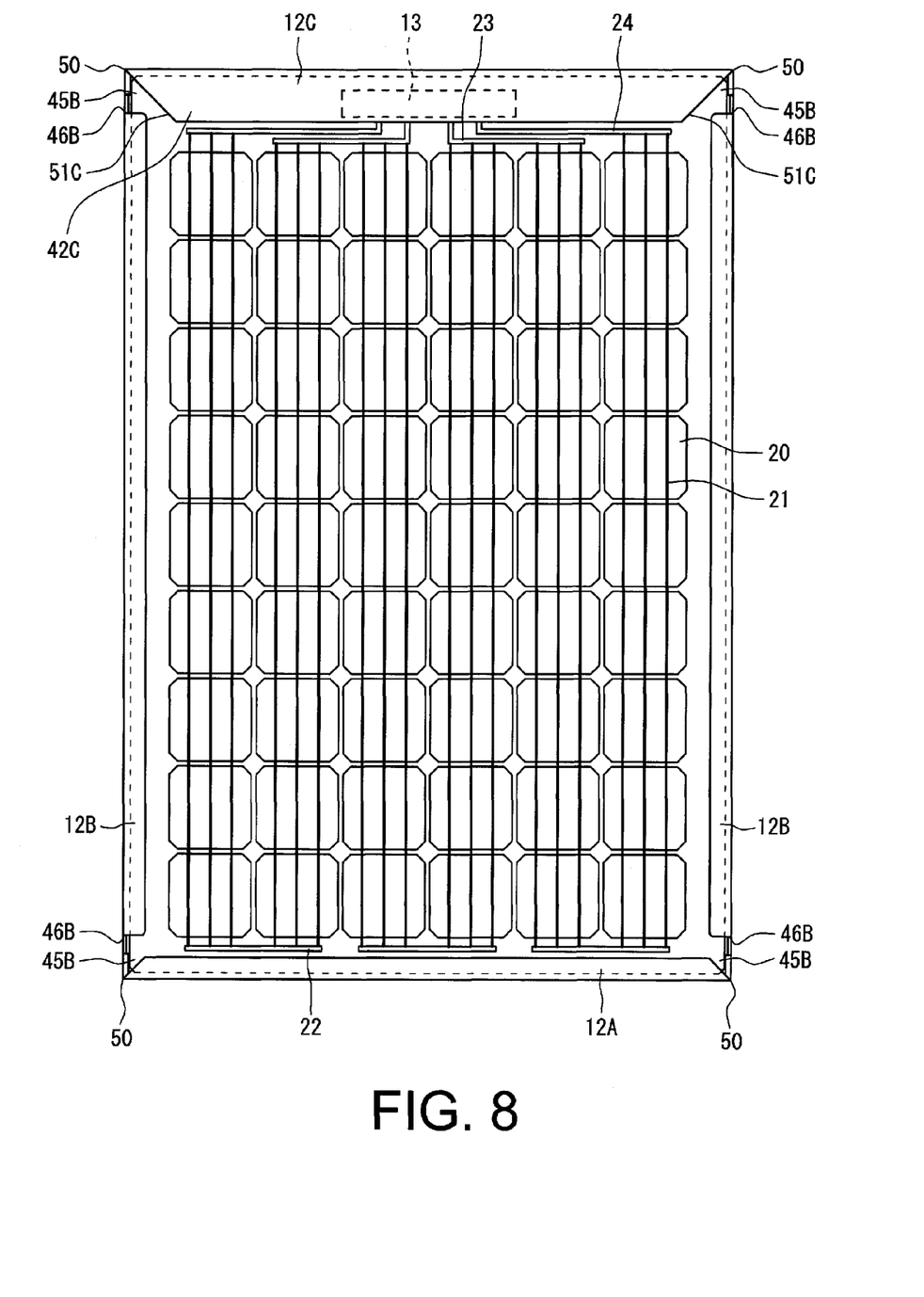
FIG. 8 is a diagram illustrating a solar cell module which is a second modification of the embodiment according to the present invention.

A mode exemplarily illustrated in FIG. 8 is different from the above-mentioned embodiment in that a nail portion 42C of a frame piece 12C attached to the terminal box 13 side largely projects inward to cover the terminal box 13. The nail portion 42C projects more inward than the inner end of the main body portion with the inclination angle, substantially 45°, of the inclination end surface 51C maintained. The frame piece 12C has a substantially trapezoidal shape (in a plan view) as a whole similarly to the frame piece 12A. By doing so, even when a transparent member is used for the second protection member, the terminal box 13 can be made invisible from the panel upper surface 11a side, and therefore, a design property of the solar cell module 10 can be enhanced, and moreover, the terminal box 13 can be protected.

Figure 9:
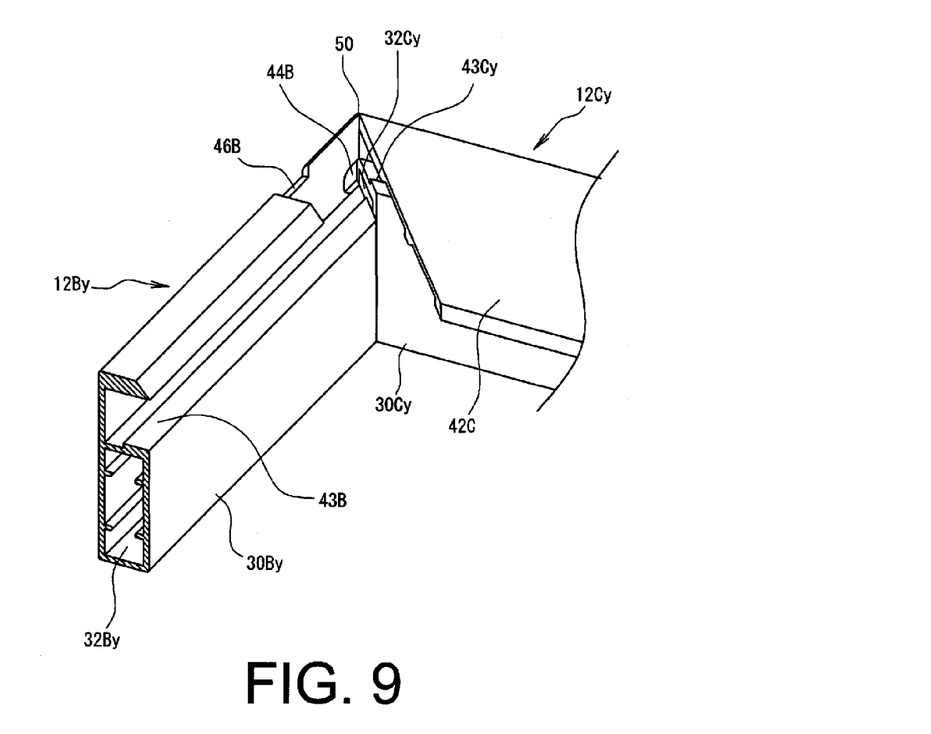
FIG. 9 is a diagram illustrating a frame of a solar cell module which is a third modification of the embodiment according to the present invention.
Figure 10:
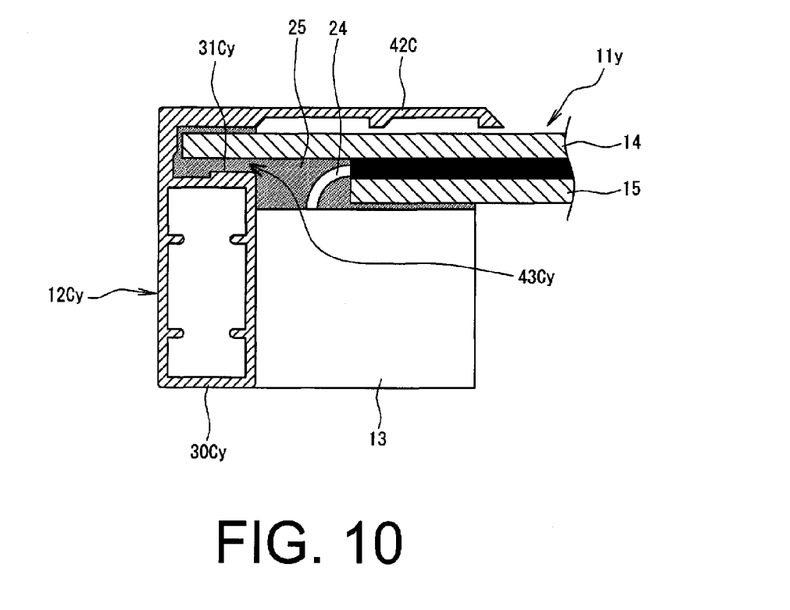
FIG. 10 is a cross section taken along a CC line in FIG. 9 and illustrates a state where the frame is attached to an edge of the solar cell panel.
Figure 11:
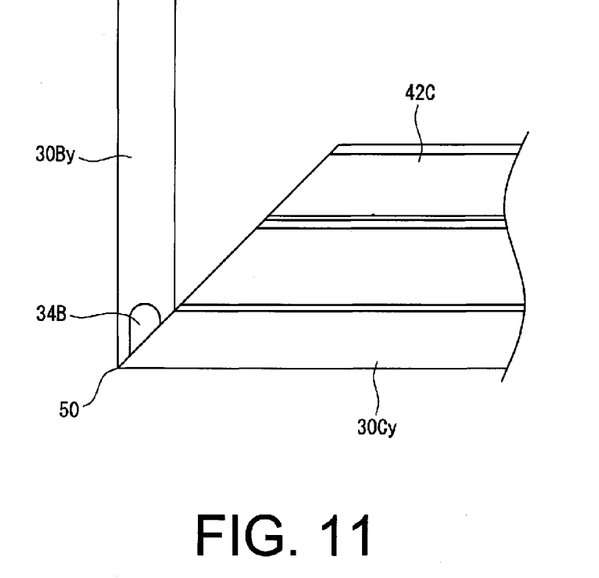
FIG. 11 is a diagram of the frame which is the third modification as seen from a lower surface side.

A mode exemplarily illustrated to FIG. 9 to FIG. 11 is different from the mode exemplarily illustrated in FIG. 8 in that a first protection member 14 extends longer than a second protection member 15 at an edge that the terminal box 13 is attached to (hereinafter referred to as "edge Z") out of the edges of a solar cell panel 11y. Namely, at the edge Z of the solar cell panel 11y, the first protection member 14 extends from the end of the second protection member 15. The second crossover wiring materials 23 and the output wiring materials 24 connected to the terminal box 13 are drawn out to the back surface side of the panel, and according to the relevant configuration, the wiring materials can be easily drawn out. Notably, at the edges other than the edge Z, the end of the first protection member 14 coincides with the end of the second protection member 15.

The above-mentioned difference causes the length of a groove 43Cy of a frame piece 12Cy, attached to the edge Z, in the vertical direction to be shorter than the length of the groove 43B of a frame piece 12By in the vertical direction. This is because while the first protection member 14 and the second protection member 15 are fitted into the groove 43B, only the first protection member 14 is fitted into the groove 43Cy. In the example illustrated in FIG. 9, the length of the main body portion 30Cy in the vertical direction is longer than the length of a main body portion 30By in the vertical direction, and in the connection portion 50, a step is formed between a upper surface 31Cy of the main body portion 30Cy and the upper surface 31B of the main body portion 30By.

As above, the drainage hole 44B is formed in the frame piece 12By. When the above-mentioned step is not present, the drainage hole may be formed in any of the two frame pieces forming the connection portion 50. Nevertheless, when the above-mentioned step is present, it is preferable that the drainage hole is formed in the frame piece having the lower upper surface of the main body portion (that is, the frame piece 12By). By doing so, drainage ability can be improved.

It is preferable that the frame piece 12By has a lower surface drainage hole 34B on the lower surface of the main body portion 30By. Similarly to the drainage hole 44B, the lower surface drainage hole 34B can be formed by cutting away the main body portion 30By from the connection portion 50 with the frame piece 12Cy. Although the lower surface drainage hole may be formed on the lower surface of the main body portion 30Cy, in view of productivity, it is preferable that processing for the drainage hole and the like is integrally performed on one frame piece.

As above, the main body portions 30By and 30Cy have the hollow portions 32B and 32Cy. Due to this, when the above-mentioned step is present, there is a case where an opening portion of the hollow portion 32Cy is present in the connection portion 50 and some of rain water or the like flows into the hollow portions 32Cy and 32B through the relevant opening portion. Nevertheless, providing the lower surface drainage hole 34B allows the water infiltrating the hollow portions 32Cy and 32B to be easily drained. In other words, providing the lower surface drainage hole 34B allows the hollow portions 32Cy and 32B to be positively used for a drainage channel. Since there is a still possibility of rain water or the like infiltrating into the hollow portions through gaps between the frame pieces in the case where the above-mentioned step is not present, it is preferable that the lower surface drainage hole is provided.

Figure 12:
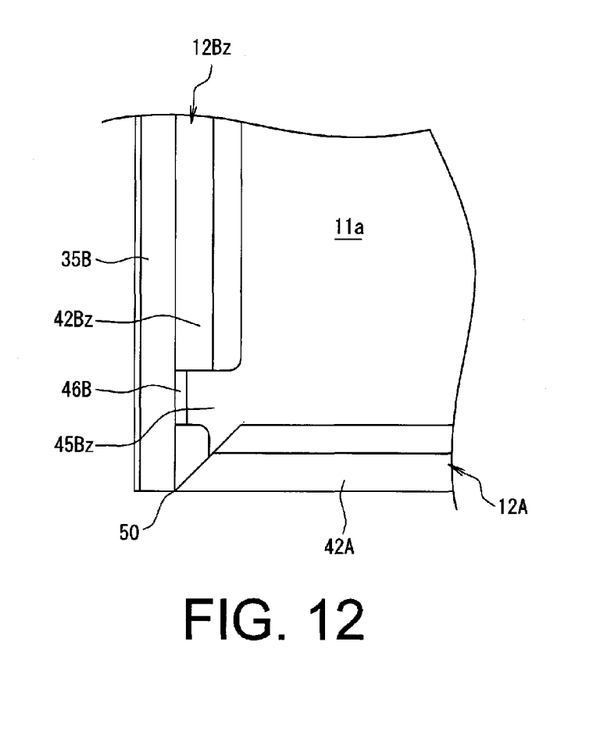
FIG. 12 is a diagram illustrating a solar cell module which is a fourth modification of the embodiment according to the present invention.

In a mode exemplarily illustrated in FIG. 12, the dimension of a water guide portion 45Bz is smaller than the dimension of the water guide portion 45B illustrated in FIG. 2. In this way, the amount of cutting away may be made small in a range that does not affect drainage ability, so that a nail portion 42Bz covers the panel upper surface 11a in the corner portion of the frame 12. Moreover, in a frame piece 12Bz, for example, there may be provided a flange portion 35B on which fittings for fixing the solar cell module 10 to a frame stand or the like can be hooked.

Various embodiments can be considered other than the modes exemplarily illustrated in FIG. 7 to FIG. 12. For example, while the mode is illustrated in which the drainage holes 44B and the like are provided at four places corresponding to the corners of the solar cell panel 11, there may be fewer (plural) drainage holes 44B or a single drainage hole. Specifically, when the installation mode of the solar cell module 10 is determined in advance, the drainage holes 44B and the like can be provided at two places corresponding to the corners, of the solar cell panel 11, which are positioned downward. Moreover, the plural terminal boxes 13 may be implemented in one module, and there may be formed the nail portions largely projecting to cover the terminal boxes 13 in the plural frames. Furthermore, while the configuration is described in which using the adhesive 25, between the solar cell panel 11 in the groove 43B and the main body portion 30B and between the solar cell panel 11 therein and the holding portion 40B, the gaps are filled, this is not limiting, and gaskets made of butyl rubber or the like may be disposed. Notably, in this case, the gaskets are provided so as not to prevent drainage in the vicinity of the corner portion of the solar cell panel 11.

The invention claimed is:

1. A solar cell module comprising:
   a solar cell panel; and
   a frame constituted by connecting a plurality of frame pieces, each of which includes
   a main body portion; and
   a holding portion provided on the main body portion to form a groove into which an edge of the solar cell panel is fitted,
   wherein in a first frame piece of the plurality of frame pieces, the holding portion comprises:
   a base which extends higher than a panel upper surface of the solar cell panel from the main body portion and covers a panel side surface of the solar cell panel;
   a nail portion which extends from the base toward the solar cell panel and covers the panel upper surface;
   a drainage hole formed by cutting away a portion, of the base, positioned lower than the panel upper surface from a connection portion of the frame pieces; and
   a water guide portion formed by cutting away the nail portion from the connection portion;
   wherein the plurality of frame pieces each comprise respective inclined end surfaces which are formed by cutting both end portions in a longitudinal direction thereof obliquely relative to the longitudinal direction to coincide with each other in the connection portion; and
   the water guide portion is a notch formed at a part of the nail portion positioned at an end portion in a longitudinal direction of the first frame piece, and is formed between the first frame piece and the inclined end surface of a second frame piece of the plurality of frame pieces.

2. The solar cell module according to claim 1, wherein
the water guide portion has a smaller area going toward the drainage hole.

3. The solar cell module according to claim 1, further comprising
a drainage outlet portion formed by cutting away a portion, of the base, positioned higher than the panel upper surface at a position separated from the connection portion, wherein
the drainage outlet portion communicates with the water guide portion.

4. The solar cell module according to claim 3, wherein
a notch width of the drainage outlet portion is smaller than a notch width of an inlet of the water guide portion.

5. The solar cell module according to claim 1, further comprising
a terminal box attached to the second frame piece along the second frame piece on a panel lower surface side of the solar cell panel, wherein
the second frame piece projects such that a nail portion of the second frame piece covers the terminal box while maintaining an inclination angle of the inclined end surface.

6. The solar cell module according to claim 1, wherein
in the first frame piece, a lower end of the drainage hole is positioned at a height substantially the same as that of an upper surface of the main body portion.

7. A solar cell module comprising:
a solar cell panel; and
a frame constituted by connecting a plurality of frame pieces, each of which includes
a main body portion; and
a holding portion provided on the main body portion to form a groove into which an edge of the solar cell panel is fitted,
wherein in a first frame piece of the plurality of frame pieces, the holding portion comprises:
a base which extends higher than a panel upper surface of the solar cell panel from the main body portion and covers a panel side surface of the solar cell panel;
a nail portion which extends from the base toward the solar cell panel and covers the panel upper surface;
a drainage hole formed by cutting away a portion, of the base, positioned lower than the panel upper surface from a connection portion of the frame pieces; and
a water guide portion formed by cutting away the nail portion from the connection portion;
wherein in the connection portion, a step is formed between an upper surface of the main body portion of the first frame piece of the plurality of frame pieces and an upper surface of the main body portion of a second frame piece of the plurality of frame pieces.

8. The solar cell module according to claim 7, wherein
the main body portion of each of the frame pieces includes a hollow portion inside, and
a lower surface drainage hole is formed on a lower surface of at least one of the main body portions.

* * * * *